(12) United States Patent
Vanderbauwede et al.

(10) Patent No.: US 11,802,524 B2
(45) Date of Patent: Oct. 31, 2023

(54) TURBOFAN COMPRISING A SERIES OF ROTARY BLADES FOR CLOSING OFF THE DUCT FOR THE SECONDARY STREAM

(71) Applicant: Airbus Operations (S.A.S.), Toulouse (FR)

(72) Inventors: Simon Vanderbauwede, Toulouse (FR); Lionel Sillieres, Toulouse (FR); Antoine Cousin, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 17/844,989

(22) Filed: Jun. 21, 2022

(65) Prior Publication Data

US 2023/0008832 A1    Jan. 12, 2023

(30) Foreign Application Priority Data

Jun. 22, 2021 (FR) ...................... 2106649

(51) Int. Cl.
| | |
|---|---|
| *F02K 1/70* | (2006.01) |
| *F02K 1/76* | (2006.01) |
| *F02K 1/66* | (2006.01) |

(52) U.S. Cl.
CPC ............ *F02K 1/763* (2013.01); *F02K 1/66* (2013.01); *F02K 1/70* (2013.01); *F05D 2220/323* (2013.01)

(58) Field of Classification Search
CPC ... F02K 1/70; F02K 1/72; F02K 1/763; F02K 1/766; F02K 1/566; F02K 1/60; F02K 1/605; F02K 1/62; F02K 1/09; F02K 3/075; F02K 1/64; F05D 2260/53; F05D 2260/606
See application file for complete search history.

(56) References Cited

U.S. PATENT DOCUMENTS

| | | | | |
|---|---|---|---|---|
| 2,933,890 A | * | 4/1960 | Morrison ................ | F02K 1/625 138/45 |
| 4,030,290 A | * | 6/1977 | Stachowiak .............. | F02K 1/64 239/265.33 |

(Continued)

FOREIGN PATENT DOCUMENTS

| | | |
|---|---|---|
| FR | 3 094 412 A1 | 10/2020 |
| FR | 3 095 015 A1 | 10/2020 |

OTHER PUBLICATIONS

French Search Report for Application No. 2106649 dated May 2, 2022.

*Primary Examiner* — Thomas P Burke
(74) *Attorney, Agent, or Firm* — KDW Firm PLLC

(57) ABSTRACT

A turbofan with a sliding element, rotary blades that can rotate between stowed and deployed positions, and a maneuvering system which moves each blade when the sliding element moves and which includes, for each blade, a rotary main shaft, for each main shaft, a transmission lever rigidly secured to the main shaft, at least two connecting strips articulated to one another, wherein each connecting strip is associated with at least three main shafts, the transmission levers of which are articulated to the connecting strip, and a drive system which rotates the first connecting strip when the sliding element moves. The use of rotary blades on the sliding element and the simplified maneuvering system makes the assembly more lightweight compared to the use of conventional reverser doors.

4 Claims, 4 Drawing Sheets

(56) References Cited

U.S. PATENT DOCUMENTS

| | | | |
|---|---|---|---|
| 2017/0198658 A1* | 7/2017 | Higgins | F02K 1/60 |
| 2019/0284952 A1* | 9/2019 | Gardes | F01D 17/167 |
| 2020/0325785 A1* | 10/2020 | Gardes | F02K 1/72 |
| 2020/0378340 A1* | 12/2020 | Cousin | F02K 1/72 |
| 2021/0207556 A1* | 7/2021 | Czapla | F02K 1/763 |
| 2021/0207557 A1* | 7/2021 | Czapla | F02K 1/72 |

* cited by examiner

TURBOFAN COMPRISING A SERIES OF ROTARY BLADES FOR CLOSING OFF THE DUCT FOR THE SECONDARY STREAM

CROSS-REFERENCE TO RELATED APPLICATION

This application claims priority to French patent application number 2106649 filed on Jun. 22, 2021, the entire disclosure of which is incorporated by reference herein.

TECHNICAL FIELD

The disclosure herein relates to a turbofan having a series of blades rotatably mounted so as to close off the duct for the secondary stream, and to an aircraft comprising at least one such turbofan.

BACKGROUND

An aircraft has a fuselage, on each side of which a wing is secured. At least one turbofan is suspended under each wing. Each turbofan is secured under the wing by a pylon which is secured between the structure of the wing and the structure of the turbofan.

The turbofan comprises an engine and a nacelle which is secured around the engine. The turbofan has, between the nacelle and the engine, a secondary duct in which a secondary stream flows.

The nacelle comprises a plurality of reverser doors, each being rotatable on the structure of the nacelle between a stowed position in which it is outside the secondary duct and a deployed position in which it is positioned across the secondary duct so as to divert the secondary stream toward a window in the wall of the nacelle, open between the secondary duct and the exterior of the nacelle.

Thus, the secondary stream is diverted outward, more specifically toward the front of the turbofan so as to produce a reverse thrust. Moreover, each reverser door is moved by a connecting rod which passes through the secondary duct in the stowed position and which thus partially obstructs the secondary duct.

Although reverser doors are entirely satisfactory, it is desirable to find different mechanisms, in particular more lightweight mechanisms which do not cause any obstruction to the secondary stream in the stowed position.

SUMMARY

One aim of the disclosure herein is a turbofan which comprises a series of blades which are rotatably mounted so as to close off the duct for the secondary stream.

To this end, it proposes a turbofan having a longitudinal axis and comprising an engine and a nacelle surrounding the engine which comprises a fan casing, wherein a duct for a secondary stream is delimited between the nacelle and the engine, in which duct an air stream circulates in a direction of flow, the nacelle comprising:

a fixed structure secured to the fan casing;
a movable assembly having a movable cowl and a sliding element, the movable cowl being secured to the sliding element, the sliding element being movable in translation on the fixed structure in a direction of translation between a forward position in which the sliding element is positioned such that the movable cowl is close to the fan casing, and a retracted position in which the sliding element is positioned such that the movable cowl is away from the fan casing so as to define between them a window that is open between the duct and the exterior of the nacelle;
a plurality of blades, each comprising a first end and a second end and wherein the blades are angularly offset one by one around the longitudinal axis, wherein each blade is movable between a stowed position in which the blade is outside the duct and a deployed position in which the blade is across the duct;
a set of actuators for moving the sliding element between the forward position and the retracted position, and vice versa; and
a maneuvering system which moves each blade from the stowed position to the deployed position when the sliding element moves from the forward position to the retracted position, and vice versa, wherein the maneuvering system comprises:
for each blade, a main shaft rotatably mounted on the sliding element about the first axis of rotation, to which the blade is secured via its first end;
for each main shaft, a transmission lever with a first end rigidly secured to the main shaft and a second end;
at least two connecting strips which are distributed angularly around the longitudinal axis, wherein the second end of one connecting strip and the first end of the next connecting strip are articulated to one another, wherein each connecting strip delimits an angular sector around the longitudinal axis, comprises a first end and a second end, and is associated with at least three main shafts located in the angular sector, wherein for a first main shaft, the corresponding transmission lever is articulated via its second end to the first end of the connecting strip, wherein for a last main shaft, the corresponding transmission lever is articulated via its second end to the second end of the connecting strip, and wherein for each intermediate main shaft between the first main shaft and the last main shaft, the corresponding transmission lever is articulated via its second end to the connecting strip between the first end and the second end of the latter; and
a drive system which converts the translational movement of the sliding element into a rotational movement of the first connecting strip about the longitudinal axis.

Such a turbofan allows a reduction in weight by replacing the reverser doors and their drive mechanisms with more lightweight pivoting blades with a simplified maneuvering system.

Advantageously, the last main shaft of one connecting strip and the first main shaft of the next connecting strip are shared, and the shared main shaft has a first transmission lever articulated to one of the connecting strips and a second transmission lever articulated to the other of the connecting strips.

Advantageously, the drive system comprises a carriage movably mounted on the movable assembly, an arm and a guide rigidly secured to the fixed structure and arranged so as to guide the carriage when the sliding element moves, the arm has an end rotatably mounted on the carriage, and the arm has an end rotatably mounted on the first connecting strip.

The disclosure herein also proposes an aircraft comprising at least one turbofan according to one of the above variants.

BRIEF DESCRIPTION OF THE DRAWINGS

The features of the disclosure herein mentioned above, and others, will become clearer on reading the following description of an example embodiment, the description being provided with reference to the attached drawings in which.

DETAILED DESCRIPTION

In the description below, terms relating to a position refer to the direction of flow of the air in a turbofan which thus flows from the front to the rear of the aircraft.

Figure 1:
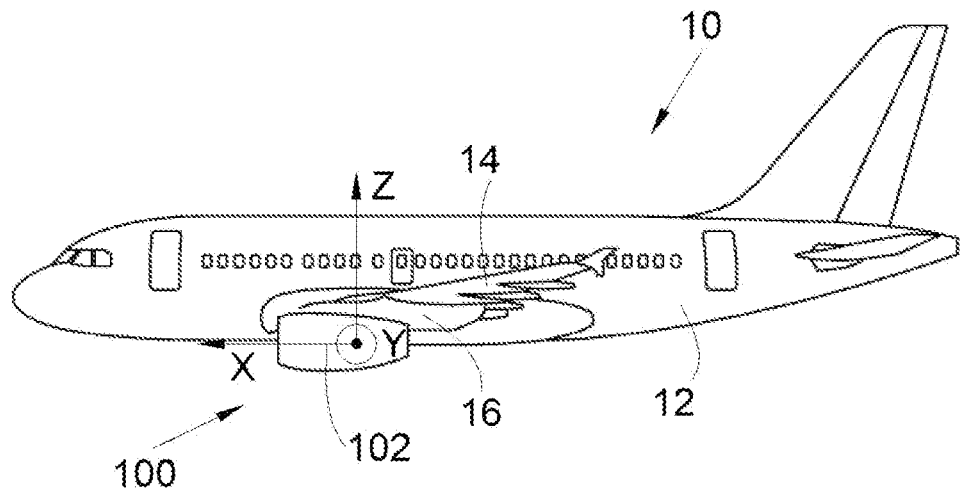
FIG. 1 is a side view of an aircraft comprising a turbofan according to the disclosure herein.

FIG. 1 shows an aircraft 10 which comprises a fuselage 12 on each side of which is secured a wing 14 bearing at least one turbofan 100 according to the disclosure herein. The turbofan 100 is secured under the wing 14 by a pylon 16.

Figure 2:
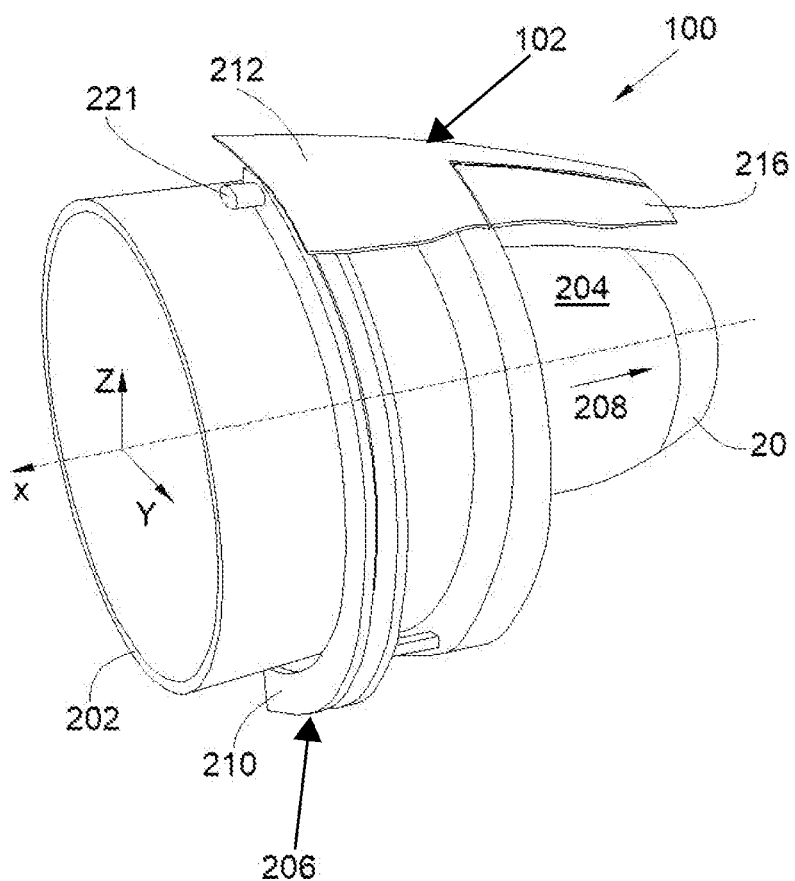
FIG. 2 is a perspective view of the turbofan according to the disclosure herein in the forward and stowed position.
Figure 3:
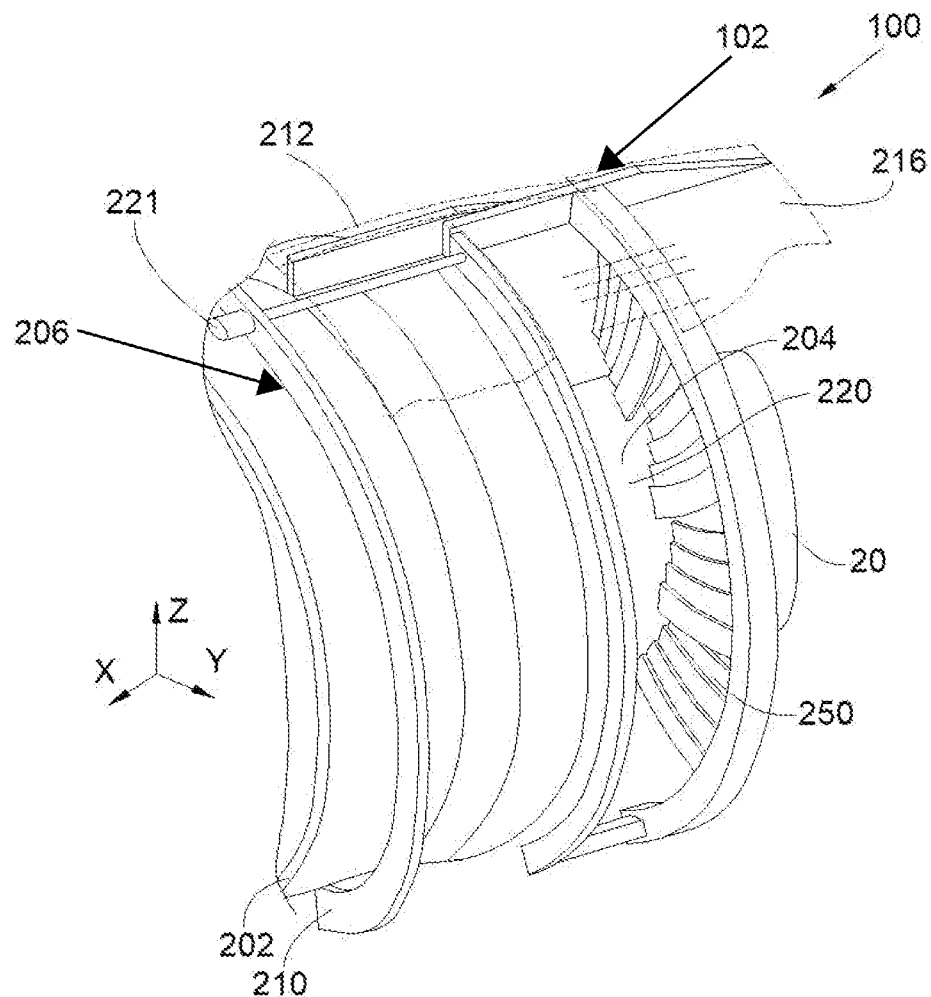
FIG. 3 is a perspective view of the turbofan according to the disclosure herein in the retracted and deployed position.

FIGS. 2 and 3 show the turbofan 100, which has a nacelle 102 and an engine 20 housed inside the nacelle 102, and which comprises a fan casing 202. The engine 20 is embodied via its rear ejection portion.

In the description below, and conventionally, X refers to the longitudinal axis of the turbofan 100 which is parallel to the longitudinal axis of the aircraft 10 oriented positively toward the front of the aircraft 10, Y refers to the transverse axis which is horizontal when the aircraft is on the ground, and Z refers to the vertical axis, these three directions X, Y and Z being orthogonal to one another.

Figure 4:
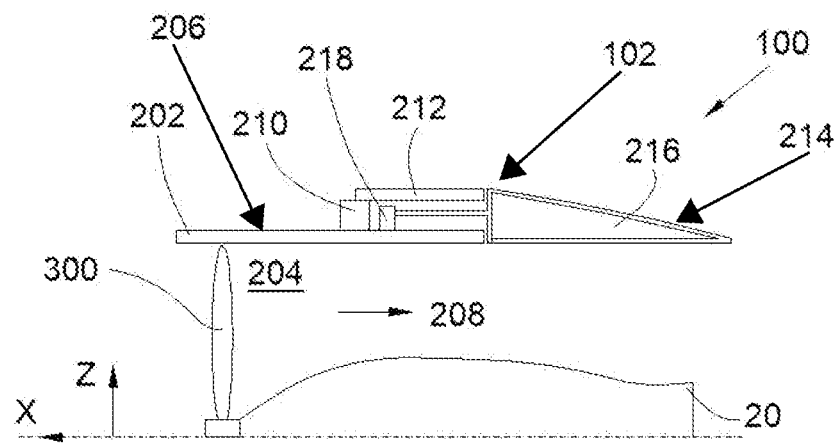
FIG. 4 schematically depicts a turbofan according to the disclosure herein in section in a vertical plane.

FIGS. 2 and 3 show the turbofan 100 in two different positions of use, while FIG. 4 is a sectional schematic view of the turbofan 100.

The turbofan 100 has, between the nacelle 102 and the engine 20, a duct 204 in which there circulates a secondary stream 208 coming from the air inlet through a fan 300, this stream thus flowing in the direction of flow which goes from the front to the rear.

The nacelle 102 has a fixed structure 206 which is fixedly mounted on the fan casing 202. In this case, the fixed structure 206 is in particular made up of a front surround 210 mounted around the fan casing 202 and outer panels 212 forming an aerodynamic surface, which are shown transparently in FIG. 3 and with part cut away in FIGS. 2 and 3.

The nacelle 102 has a movable assembly 214 which includes a movable cowl 216 (also transparent in FIG. 3 and not shown in FIGS. 6 and 7), part of which is cut away in FIGS. 2 and 3, which forms the outer walls of the nozzle.

The movable assembly 214 also has a sliding element 218. The sliding element 218 in this case takes the form of a cylinder with perforated walls. The movable cowl 216 is secured to and downstream of the sliding element 218 relative to the direction of flow of the air stream in the turbofan 100.

The sliding element 218 is movably mounted in translation in a direction of translation generally parallel to the longitudinal axis X on the fixed structure 206 of the nacelle 102.

The sliding element 218 is movable between a forward position (FIG. 2) and a retracted position (FIG. 3) and vice versa. In the forward position, the sliding element 218 is positioned as far forward as possible relative to the direction of flow such that the movable cowl 216 is close to the outer panels 212 and the fan casing 202, thus forming an aerodynamic surface. In the retracted position, the sliding element 218 is positioned as far rearward as possible relative to the direction of flow such that the movable cowl 216 is away from the outer panels 212 and the fan casing 202 so as to define a window 220 between them.

In the forward position, the movable cowl 216 and the outer panels 212 lie in the extension of one another so as to define the outer surface of the nacelle 102, and the movable cowl 216 and the fan casing 202 lie in the extension of one another so as to define the outer surface of the duct 204.

In the retracted position, the movable cowl 216 and the fan casing 202 along with the outer panels 212 are spaced apart and define between them the window 220 open between the duct 204 and the exterior of the nacelle 102. In other words, the air of the secondary stream 208 passes through the window 220 so as to reach the exterior of the turbofan 100.

Figure 6:
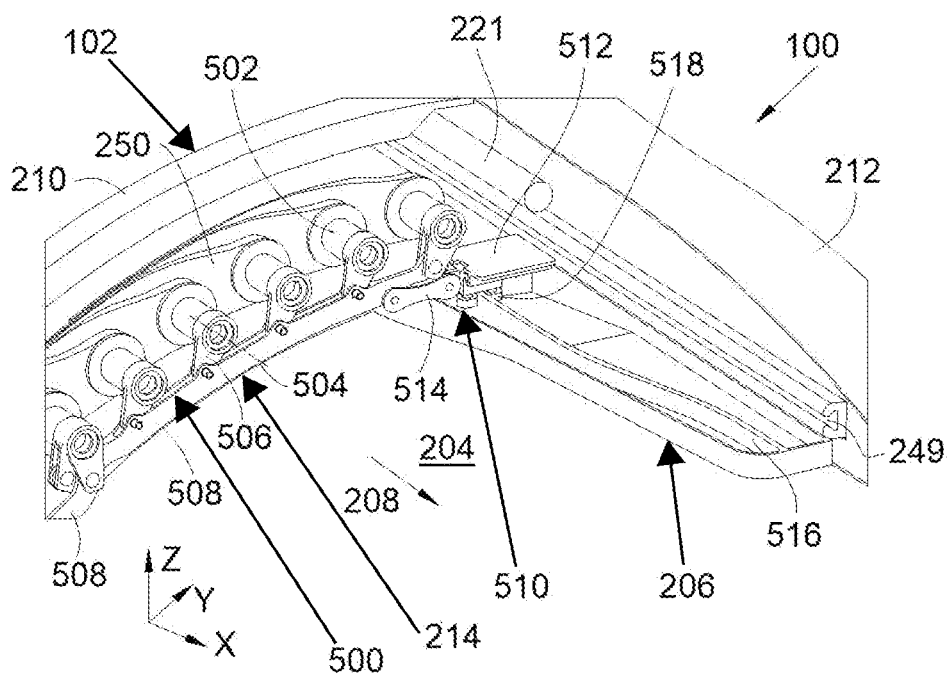
FIG. 6 is a perspective view of the maneuvering system and the blades in the stowed position.
Figure 7:
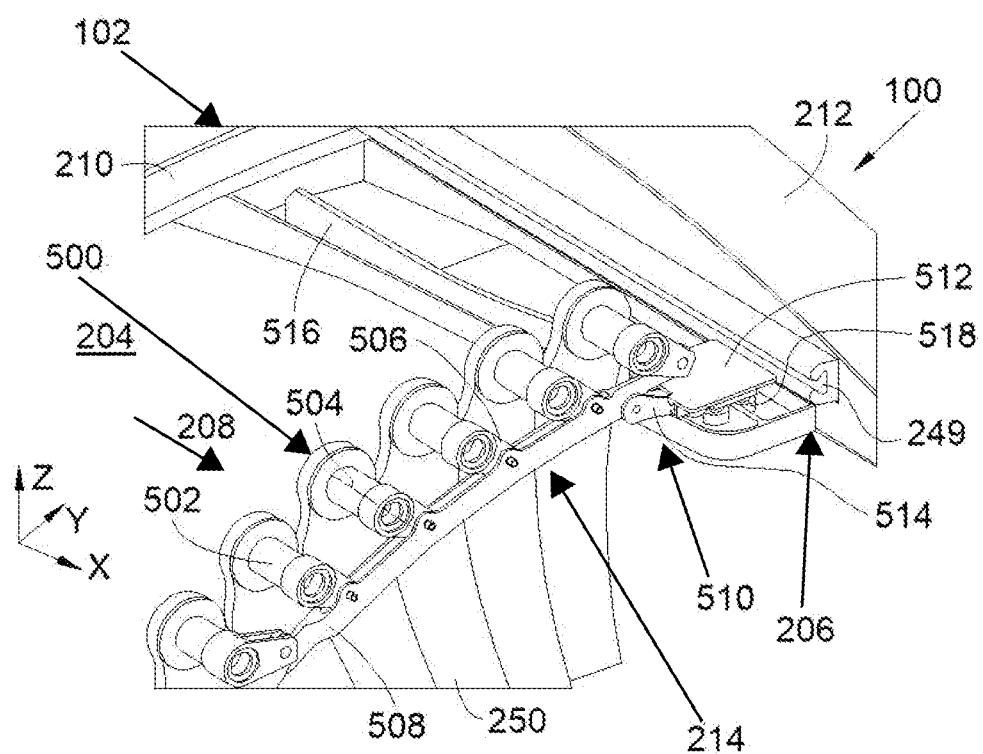
FIG. 7 is a perspective view of the maneuvering system and the blades in the deployed position.

The sliding element 218 is guided in translation by any appropriate approach, such as rail systems 249 between the fixed structure 206 and the sliding element 218, as shown in FIGS. 6 and 7.

The nacelle 102 further comprises a set of actuators 221 that move the movable assembly 214 and hence the sliding element 218 in translation between the forward position and the retracted position and vice versa. Each actuator 221 is controlled by a control unit, such as a processor, which controls the movements in one direction or the other as required by the aircraft 10.

Each actuator 221 may for example take the form of a double-acting jack (operating in two directions), the cylinder of which is secured to the fixed structure 206, and more particularly in this case to the front surround 210, and a rod secured to the sliding element 218.

To orient the air stream leaving the window 220, cascades may be secured to the sliding element 218 facing the window 220.

The fan casing 202 and the outer panels 212 delimit the window 220 upstream with respect to the direction of flow and the movable cowl 216 delimits the window 220 downstream with respect to the direction of flow.

The nacelle 102 comprises a plurality of blades 250 which are moved by a maneuvering system 500.

Figure 5:
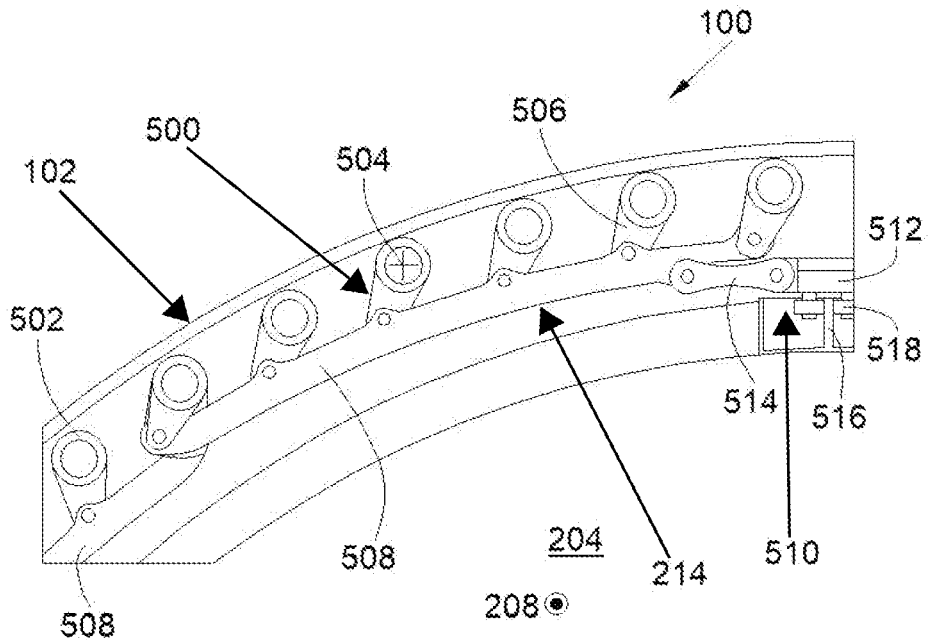
FIG. 5 is an end-on view of a maneuvering system according to the disclosure herein.

FIGS. 5, 6 and 7 show the maneuvering system 500 according to the disclosure herein.

Each blade 250 is rotatably mounted on the sliding element 218 (not shown in FIGS. 5 through 7) about a first axis of rotation 504 which is in this case generally parallel to the direction of translation. Each blade 250 is thus movable between a stowed position (FIGS. 2 and 6) in which the blade 250 is outside the duct 204, and a deployed position (FIGS. 3 and 7) in which the blade 250 is across the duct 204 so as to divert the secondary stream 208 toward the window 220.

Each blade 250 is movably mounted at a first end while a second end moves closer to the engine 20 when the blade 250 is deployed so as to close off the duct 204 as far as possible.

The blades 250 are angularly offset one by one around the longitudinal axis X.

The number of blades 250 and the shape of each one depend on the dimensions of the turbofan 100 and on the width of each blade 250 so that, in the deployed position, the blades 250 close off most of the duct 204.

To go from the stowed position to the deployed position, the blade 250 is rotated toward the interior of the turbofan 100.

The stowed position is taken up when the sliding element 218 is in the forward position and the deployed position is taken up when the sliding element 218 is in the retracted position.

The maneuvering system 500 moves each blade 250 from the stowed position to the deployed position when the sliding element 218 moves from the forward position to the retracted position, and vice versa.

Operation thus consists, starting from the forward/stowed position, in commanding the activation of the actuators 221 so as to move the sliding element 218 from the forward position to the retracted position. During this movement, the maneuvering system 500 moves the blades 250 from the stowed position to the deployed position.

In reverse, operation thus consists, starting from the retracted/deployed position, in commanding the activation of the actuators 221 so as to move the sliding element 218 from the retracted position to the forward position. During this movement, the maneuvering system 500 moves the blades 250 from the deployed position to the stowed position.

The use of blades 250 rotatably mounted on the sliding element 218 makes the assembly more lightweight compared to the use of reverser doors as in the prior art.

For each blade 250, the maneuvering system 500 comprises a main shaft 502 which is rotatably mounted on the sliding element 218 about the corresponding first axis of rotation 504, and to which the blade 250 is secured via its first end. To go from the deployed position to the stowed position and vice versa, the main shaft 502 and hence the blade 250 are rotated about the first axis of rotation 504. In this case, each main shaft 502 is rotatably mounted on the sliding element 218, by example by insertion of the main shaft 502 in a bore of the sliding element 218.

The maneuvering system 500 makes it possible to rotate a plurality of blades 250 arranged side by side.

The maneuvering system 500 further comprises at least two connecting strips 508 which are distributed angularly around the longitudinal axis X; in particular, according to one particular embodiment, there are four connecting strips 508 per side of the turbofan 100. Each connecting strip 508 delimits an angular sector around the longitudinal axis X. Each connecting strip 508 thus comprises a first end and a second end.

There are thus a first connecting strip 508 with a first end and a second end, a second connecting strip 508 with a first end arranged in the vicinity of the second end of the first connecting strip 508 and a second end, and so on up to the last connecting strip 508.

In this case, each connecting strip 508 has a curved shape generally coaxial with the longitudinal axis X.

Each connecting strip 508 is associated with a series of at least three main shafts 502 which are located in the angular sector delimited by the connecting strip 508 around the longitudinal axis X. There are thus a first main shaft 502 corresponding to one end of the angular sector, a last main shaft 502 corresponding to the other end of the angular sector, and at least one intermediate main shaft 502 between the first main shaft 502 and the last main shaft 502.

For each main shaft 502, the maneuvering system 500 comprises, in this case upstream of the blade 250, a transmission lever 506 which has a first end rigidly secured to the main shaft 502 and a second end.

The transmission lever 506 corresponding to the first main shaft 502 is articulated via its second end to the first end of the associated connecting strip 508. The transmission lever 506 corresponding to the last main shaft 502 is articulated via its second end to the second end of the associated connecting strip 508. The transmission lever 506 corresponding to each intermediate main shaft 502 is articulated via its second end to the connecting strip 508 between the first end and the second end of the latter.

As explained below, the first connecting strip 508 is moved by a movement system 510 and to move the connecting strips 508 one after the other, the second end of one connecting strip 508 (for example the first connecting strip 508) and the first end of the next connecting strip 508 (for example the second connecting strip 508) are articulated to one another and so on, one by one.

In the embodiment of the disclosure herein shown in FIGS. 5 through 7, two consecutive connecting strips 508 are articulated to one another by a shared main shaft 502 as explained below, but in another embodiment not shown, the two connecting strips 508 could be articulated to one another directly.

In the embodiment of the disclosure herein shown here, the last main shaft 502 of one connecting strip 508 and the first main shaft 502 of the next connecting strip 508 are shared, and the two connecting strips 508 are articulated to one another by the transmission levers 506.

The shared main shaft 502 thus has a first transmission lever 506 articulated to one of the connecting strips 508 and a second transmission lever 506 articulated to the other of the connecting strips 508.

Thus, when the first connecting strip 508 is moved by the movement system 510, this movement is passed on to the other connecting strips 508 by the successive articulations and the movement of each connecting strip 508 causes the pivoting of each main shaft 502 about its axis of rotation 504 by the action of the transmission levers 506 and hence the deployment or stowing of the blades 250, as applicable.

The articulation of each transmission lever 506 on the associated connecting strip 508 is at least one rotation about an axis of rotation generally parallel to the longitudinal axis X, but is preferably a ball joint.

In the embodiment of the disclosure herein shown here, each transmission lever 506 associated with an end of a connecting strip 508 takes the form of a yoke in which the end is inserted.

For each transmission lever 506 of an intermediate main shaft 502, the connecting strip 508 has a slot in which the transmission lever 506 is inserted. The connecting strip 508 thus forms a yoke in which the transmission lever 506 is inserted.

To maneuver the connecting strip 508, the maneuvering system 500 comprises a drive system 510 which converts the translational movement of the sliding element 218 into a movement of the first connecting strip 508 which is a rotation about the longitudinal axis X then, by virtue of the transmission levers 506 and the successive articulations of the other connecting strips 508, each main shaft 502 rotates and deploys or stows the associated blade 250.

The maneuvering system 500 is thus particularly lightweight and easy to use.

The drive system 510 consists primarily of a system which alternately pulls or pushes on the first end of the first connecting strip 508 in a direction 20 generally transverse with respect to the direction of translation. In general, the drive system 510 moves the first connecting strip 508 in a first direction so as to deploy the blades 250 and in a second direction, opposite to the first direction, to stow the blades 250.

In the embodiment of the disclosure herein of FIGS. 6 and 7, the drive system 510 comprises a carriage 512, an arm 514 and a guide 516 rigidly secured to the fixed structure 206 and arranged so as to guide the carriage 512 when the sliding element 218 moves.

The arm 516 has an end rotatably mounted on the carriage 512, in this case about an axis parallel to the direction of translation, and an end rotatably mounted on the first connecting strip 508, in this case about an axis parallel to the direction of translation.

When the sliding element 218 moves parallel to the direction of translation, the main shafts 502 and the connecting strips 508 move in the same direction and, owing to the presence of the arm 514, the carriage 512 is movably mounted on the movable assembly 214 and follows the same movement.

The carriage 512 is moreover forced to follow the guide 516 which is fixed and the shape of which tends to move the carriage 512 transversely relative to the direction of translation. The carriage 512 thus moves in translation parallel to the direction of translation and transversely relative to this same direction. To this end, the guide 516 has a direction generally parallel to the direction of translation and has deviations ensuring the correct movement of the carriage 512.

Thus, when the sliding element 218 moves from the stowed position to the deployed position, the carriage 512 first follows the direction of translation then, while continuing in the same direction, moves transversely so as to pull on the arm 514 and thus deploy the blades 250. In reverse, when the sliding element 218 moves from the deployed position to the stowed position, the carriage 512 moves parallel and transversely to the direction of translation so as to push on the arm 514 and thus stow the blades 250 before continuing parallel to the direction of translation so as to come back into the forward position.

In the embodiment of the disclosure herein shown in FIGS. 6 and 7, the carriage 512 has four rollers 518 (only two are visible) which are arranged in pairs on either side of the guide 516.

The disclosure herein has been described more specifically in the case of a nacelle under a wing but it may be applied to a nacelle located at the rear of the fuselage.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority

The invention claimed is:

1. A turbofan having a longitudinal axis and comprising an engine and a nacelle surrounding the engine which comprises a fan casing, wherein a duct for a secondary stream is between the nacelle and the engine, in which duct the secondary stream circulates in a direction of flow, the nacelle comprising:
a fixed structure secured to the fan casing;
a movable assembly having a movable cowl and a sliding element, the movable cowl being secured to the sliding element, the sliding element being movable in translation on the fixed structure in a direction of translation between a forward position in which the sliding element is positioned such that the movable cowl is close to the fan casing, and a retracted position in which the sliding element is positioned such that the movable cowl is away from the fan casing to define between them a window that is open between the duct and an exterior of the nacelle;
a plurality of blades, each comprising a first end and a second end and wherein the blades are angularly offset one by one around the longitudinal axis, wherein each blade is movable between a stowed position in which the blade is outside the duct and a deployed position in which the blade is across the duct;
a set of actuators for moving the sliding element between the forward position and the retracted position, and vice versa; and
a maneuvering system which moves each blade from the stowed position to the deployed position when the sliding element moves from the forward position to the retracted position, and vice versa, wherein the maneuvering system comprises:
for each blade, a main shaft rotatably mounted on the sliding element about a first axis of rotation, to which the first end of the blade is secured;
for each main shaft, a transmission lever with a first end rigidly secured to the main shaft and a second end;
at least two connecting strips which are distributed angularly around the longitudinal axis, wherein a second end of one connecting strip and a first end of a next connecting strip are articulated to one another, wherein each connecting strip delimits an angular sector around the longitudinal axis, comprises a first end and a second end, and is associated with at least three main shafts located in the angular sector, wherein for a first main shaft, the second end of a corresponding transmission lever is articulated to the first end of a corresponding connecting strip, wherein for a last main shaft, the second end of a corresponding transmission lever is articulated to the second end of the corresponding connecting strip, and wherein for each intermediate main shaft between the first main shaft and the last main shaft, the second end of a corresponding transmission lever is articulated to the corresponding connecting strip between the first end and the second end of the corresponding connecting strip; and
a drive system which converts translational movement of the sliding element into a rotational movement of the connecting strips about the longitudinal axis.

2. The turbofan of claim 1, wherein the last main shaft of one connecting strip and the first main shaft of the next connecting strip are shared, and wherein the shared main shaft has a first transmission lever articulated to one of the connecting strips and a second transmission lever articulated to another of the connecting strips.

3. The turbofan of claim 1, wherein the drive system comprises a carriage movably mounted on the movable assembly, an arm and a guide rigidly secured to the fixed structure and configured to guide the carriage when the sliding element moves, wherein the arm has an end rotatably mounted on the carriage, and wherein the arm has an end rotatably mounted on the first connecting strip.

4. An aircraft comprising at least one turbofan of claim 1.

* * * * *